United States Patent
Earl

Patent Number: 5,861,744
Date of Patent: Jan. 19, 1999

[54] ABS SPEED SIGNAL INPUT FILTER HAVING MID-FREQUENCY ATTENUATION

[75] Inventor: Kenneth C. Earl, Brighton, Mich.

[73] Assignee: Kelsey-Hayes Company, Livonia, Mich.

[21] Appl. No.: 798,576

[22] Filed: Feb. 10, 1997

Related U.S. Application Data

[60] Provisional application No. 60/011,616, Feb. 13, 1996.

[51] Int. Cl.[6] .............................. G01P 3/48; G01P 3/488; B60T 8/32; H03H 7/01
[52] U.S. Cl. .................. 324/166; 324/76.46; 188/181 R; 303/138; 333/172; 702/148
[58] Field of Search ...................................... 324/106–166, 324/173–175, 177, 76.29, 76.31, 76.44, 76.45, 76.46, 76.68, 128; 327/551–558; 333/172; 364/565; 188/181 R; 303/138; 361/239, 240; 340/466, 670, 671; 702/145, 148

[56] References Cited

U.S. PATENT DOCUMENTS

| 2,944,419 | 7/1960 | Paalu .................................... 324/162 X |
| 3,908,167 | 9/1975 | Hulls et al. .............................. 324/166 |
| 4,290,090 | 9/1981 | Yamamoto et al. . |
| 4,439,728 | 3/1984 | Rickman, Jr. ............................ 324/164 |
| 4,468,740 | 8/1984 | Beck et al. . |
| 5,007,007 | 4/1991 | van Zanten et al. . |
| 5,250,896 | 10/1993 | Mieczkowski et al. ................. 324/174 |
| 5,394,035 | 2/1995 | Elwell . |

FOREIGN PATENT DOCUMENTS

| 27429 | 7/1931 | Austria ................................... 333/172 |
| 50730 | 3/1988 | Japan ...................................... 364/565 |

*Primary Examiner*—Gerard Strecker
*Attorney, Agent, or Firm*—MacMillan, Sobanski & Todd, LLC

[57] ABSTRACT

An input filter for a vehicle anti-lock brake system control module has a filter section for attenuating input signals having mid-range frequencies.

12 Claims, 3 Drawing Sheets

ABS SPEED SIGNAL INPUT FILTER HAVING MID-FREQUENCY ATTENUATION

CROSS REFERENCE TO RELATED APPLICATIONS

This application claims the benefit of U.S. Provisional Application Ser. No. 60/011,616, filed Feb. 13, 1996.

BACKGROUND OF THE INVENTION

This invention relates in general to anti-lock brake systems (ABS) and in particular to a wheel speed signal input filter for an ABS control module which includes a filter section for attenuating mid-frequency input signals.

An Anti-lock Brake System (ABS) is often included as standard or optional equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

An ABS further includes an electronic control module which has a microprocessor. The control module is electrically coupled to the pump motor, a plurality of solenoid coils associated with the solenoid valves and wheel speed sensors for monitoring the speed and deceleration of the controlled wheels. The control module is typically mounted upon the control valve body to form a compact unit which is often referred to as an ABS electro-hydraulic control unit.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

The wheel speed sensors are usually passive variable reluctance magnetic transducers which sense the rotation of an associated exciter ring. The exciter ring is formed from a ferrous metal and has a plurality of teeth formed about the circumference thereof. The exciter ring is typically mounted directly upon a vehicle wheel hub or on the ring gear in a differential assembly.

Passive variable reluctance transducers typically include a permanent magnet which is adjacent to an end of a pole piece formed from a ferrous material. The opposite end of the pole piece is shaped as a tip which extends from the transducer and is spaced apart from the exciter ring teeth by an air gap. A coil surrounds the pole piece and is electrically connected to the ABS control module. Examples of prior art variable reluctance magnetic transducers are shown in U.S. Patent Nos. 5,032,790 and 5,486,758.

During operation, a magnetic field extends from the end of the permanent magnet which is adjacent to the pole piece. The magnetic field passes through the pole piece and across the air gap to the exciter ring. A return path for the magnetic field extends through the exciter ring and the air to the end of the permanent magnet which is opposite from the pole piece. As an exciter ring tooth approaches the pole piece tip, the reluctance of the magnetic field decreases, causing the strength of the magnetic field to increase. Conversely, as the exciter ring tooth moves away from the pole piece tip, the reluctance of the magnetic field increases, causing the strength of the magnetic field to decrease. As the magnetic field strength increases, a first voltage is induced across the coil. Similarly, as the magnetic field strength decreases, a second voltage, having a polarity which is opposite to the polarity of the first voltage, is induced across the coil. The passage of successive exciter ring teeth past the pole piece tip induces an alternating voltage across the coil.

The induced alternating voltage is generally proportional to the rate of change of the magnetic field. More specifically, as the exciter ring speed increases, the magnitude of the alternating voltage also increases. Additionally, the frequency of the alternating voltage is directly proportional to the number of exciter ring teeth which pass the tip of the pole piece per unit of time. As described above, the rotation of the exciter ring is associated with the controlled vehicle wheel. Thus, the frequency of the induced alternating voltage is proportional to the rotational speed of the vehicle wheel associated with the exciter ring.

The voltage induced across the transducer coil is supplied to the ABS control module as a speed signal for the controlled vehicle wheel. As described above, the microprocessor in the control module monitors the frequency of the speed signal and is responsive thereto to determine the speed and acceleration of the associated vehicle wheel. However, the speed signal typically includes high frequency noise components which are induced upon the coil by electromagnetic radiation from other vehicle components. These noise components are incompatible with the proper operation of the control module electronics and could adversely affect the operation of the electronics by introducing unwanted signals which could be misinterpreted as speed signals. Accordingly, an ABS input filter circuit which attenuates the components of noise having frequencies above the highest frequencies of interest for ABS operation is usually included between the variable reluctance transducer and the control module electronics.

SUMMARY

This invention relates to an improved input filter for an ABS control unit which includes a filter section for attenuating signals having mid-range frequencies.

Variable reluctance transducers have been known to generate unwanted output noise signals due to mechanical vibration of the sensor. These vibration induced noise signals can fall within the passband of the input filter for an anti-lock brake system control module. When this occurs, the noise signals are passed through the input filter to the control module and may, if large enough, appear to be speed signals. Such speed signals are false, but can trigger an unneeded anti-lock braking cycle. Accordingly, it would be desirable to block such vibration induced noise signals from the control module.

The present invention contemplates a signal filter comprising a first filter section for attenuating signals in a high frequency range and a second filter section for attenuating signals in a mid-frequency range. The signals being filtered are proportional to a vehicle operating parameter.

The invention further contemplates that the filter has at least one input terminal adapted to be connected to a sensor for generating the signals and one output terminal adapted to be connected to a control module. The first filter section includes a first resistor connected between the input and output terminals and a first capacitor connected between the output terminal and ground. Similarly, the second filter section includes a second capacitor having first and second ends, the first end of the second capacitor being connected to the output terminal, and a second resistor connected between the second end of the second capacitor and ground. Additionally, the filter can include a third capacitor connected between the filter input terminal and ground.

The control module can be included in an anti-lock brake system with the sensor generating a signal which is proportional to the speed of a wheel controlled by the anti-lock brake system.

The invention also contemplates an alternate embodiment of the signal filter having first and second input terminals adapted to be connected across the sensor and first and second output terminals adapted to be connected to the control module. The filter includes a first filter section for attenuating high frequency signals connected between the first input terminal and ground, a second filter section for attenuating high frequency signals connected between the second input terminal and ground, and a third filter section for attenuating mid-range frequency signals connected between the output terminals.

It is further contemplated that the first and second filter sections each include a resistor connected between one of the input terminals and one of the output terminals and a capacitor connected between the junction of the resistor and the output terminal and ground. Additionally, the third filter section includes a mid-range capacitor having first and second ends, the first end of the mid-range capacitor being connected to one of the output terminals, and a mid-range resistor connected between the second end of the mid-range capacitor and the other of the output terminals. An electromagnetic compatibility capacitor can be connected between the input terminals.

The invention further contemplates another embodiment of the filter which includes an analog to digital converter having an input terminal adapted to receive an analog signal generated by the sensor and an output terminal, the converter being operative to generate a digital signal which is a function of the applied analog signal. The filter also includes a digital filter having an input terminal connected to the output terminal of the analog to digital converter and an output terminal. The digital filter is operable to attenuate mid-range and high frequency digital signals with the attenuated signal appearing at the filter output terminal. The control module is connected to the digital filter output terminal. It also is contemplated that the control module can include a microprocessor with the digital filter being included within the microprocessor.

DETAILED DESCRIPTION OF THE PREFERRED EMBODIMENT

Figure 1:
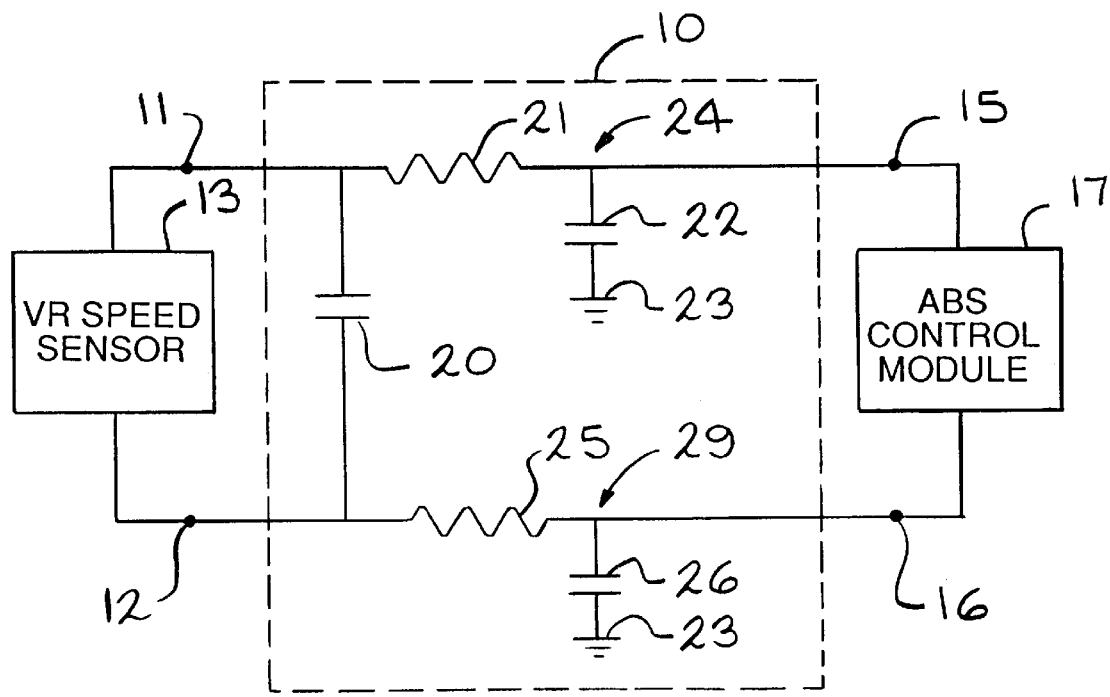
FIG. 1 is a schematic diagram of a prior art ABS input filter.

Referring now to the drawings, there is shown in FIG. 1, a typical prior art ABS input filter 10. The input filter 10 has first and second input terminals, labeled 11 and 12, respectively. The input terminals 11 and 12 are electrically connected across a variable reluctance transducer or speed sensor 13. The input filter 10 also has first and second output terminals, labeled 15 and 16, respectively. The output terminals 15 and 16 are electrically connected across an ABS electronic control module 17.

The input filter 10 includes an input capacitor 20 connected across the input terminals 11 and 12. The input capacitor 20 has a value selected in accordance with the Electromagnetic Compatibility (EMC) requirements of the control module 17. The input capacitor 20 cooperates with the internal resistance and inductance of the speed sensor 13 to attenuate unintentional electromagnetic radiation from the sensor 13 which could be disruptive to the control module or other vehicle electronics.

The input filter 10 also includes a first filter resistor 21 which is connected between the first input terminal 11 and the first output terminal 15. A first filter capacitor 22 has a first end connected between the junction of the first filter resistor 21 and the first output terminal 15 and a second end connected to ground 23. The first filter resistor and capacitor 21 and 22 cooperate to form a first low pass filter section 24.

Similarly, the input filter 10 further includes a second filter resistor 25 which is connected between the second input terminal 12 and the second output terminal 16. A second filter capacitor 26 has a first end connected between the junction of the second filter resistor 25 and the second output terminal 16 and a second end connected to ground 23. The second filter resistor and capacitor 25 and 26 cooperate to form a second low pass filter section 27. The use of two low pass filter sections 24 and 27 allows the sensor voltage to float with reference to ground 23.

The first and second low pass filter sections 24 and 27 attenuate the higher frequency signals produced by the sensor 13, blocking them from transmission to the control module 17. A typical frequency response for the input filter 10 is illustrated by the curve labeled "A" in FIG. 2. In the example shown by curve A in FIG. 2, signals having a frequency above one Khz are attenuated by the filter 10. Thus, the input filter 10 defines an operational range for sensor speed signals from zero to approximately two Khz, above which the signal amplitude is too low for the ABS control module to 17 detect.

As described above, variable reluctance transducers 13 have been known to generate unwanted output noise signals due to mechanical vibration of the sensor. These vibration induced noise signals can fall within the passband of the input filter 10. When this occurs, the noise signals are passed through the input filter 10 to the control module 17 where the noise signals may, if large enough, appear to be speed signals. Such speed signals are false, but can trigger an unneeded anti-lock braking cycle.

Figure 3:
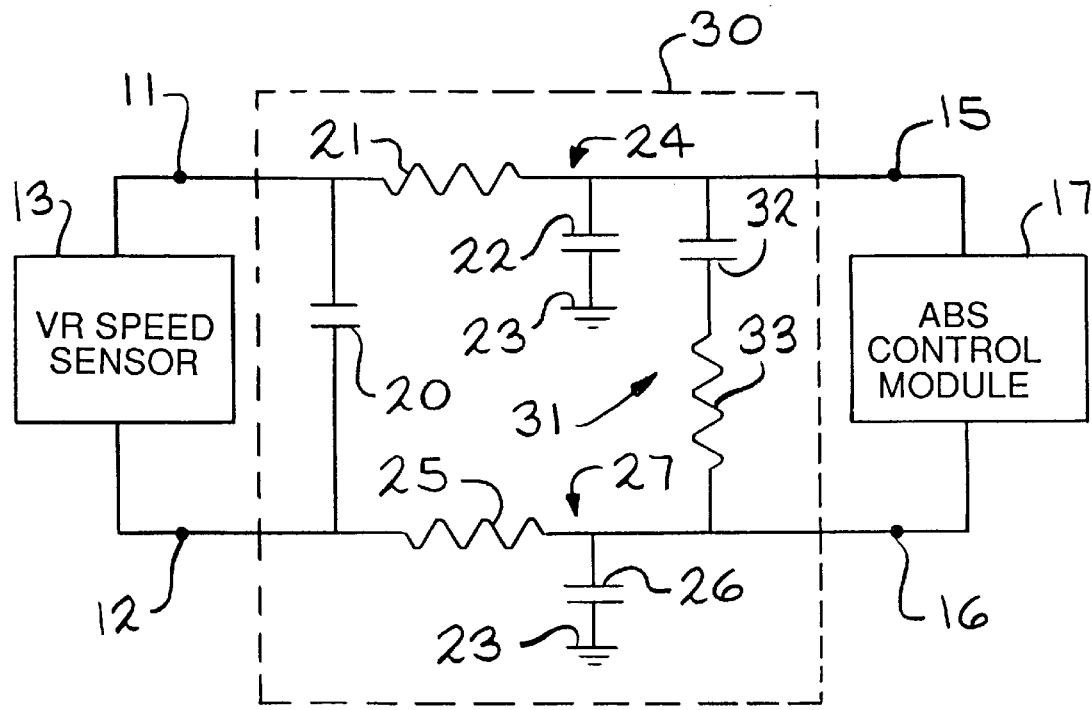
FIG. 3 is a schematic diagram of an ABS input filter in accordance with the invention.

The present invention contemplates an improved ABS input filter 30, as shown in FIG. 3, which includes a mid-range frequency filter section 31. The components shown in FIG. 3 which are similar to corresponding components in FIG. 1 are identified by the same numerical designators.

The mid-range frequency filter section 31 includes a third filter capacitor 32 having one end connected to the first output terminal 15 and the other end connected to one end of a third filter resistor 33. The other end of the third filter resistor 33 is connected to the second output terminal 16. Thus, the mid-range filter section 31 is connected across the output terminals 15 and 16 of the improved input filter 30. In the preferred embodiment, the components of the filter 30 have the values shown in the following table:

| Component | Value |
| --- | --- |
| EMC Capacitor | 0.001 uf |
| First Filter Resistor | 22K |
| First Filter Capacitor | 0.01 uf |
| Second Resistor | 22K |
| Second Filter Capacitor | 0.01 uf |
| Third Filter Capacitor | 0.047 uf |
| Third Filter Resistor | 8.2K |

Figure 2:
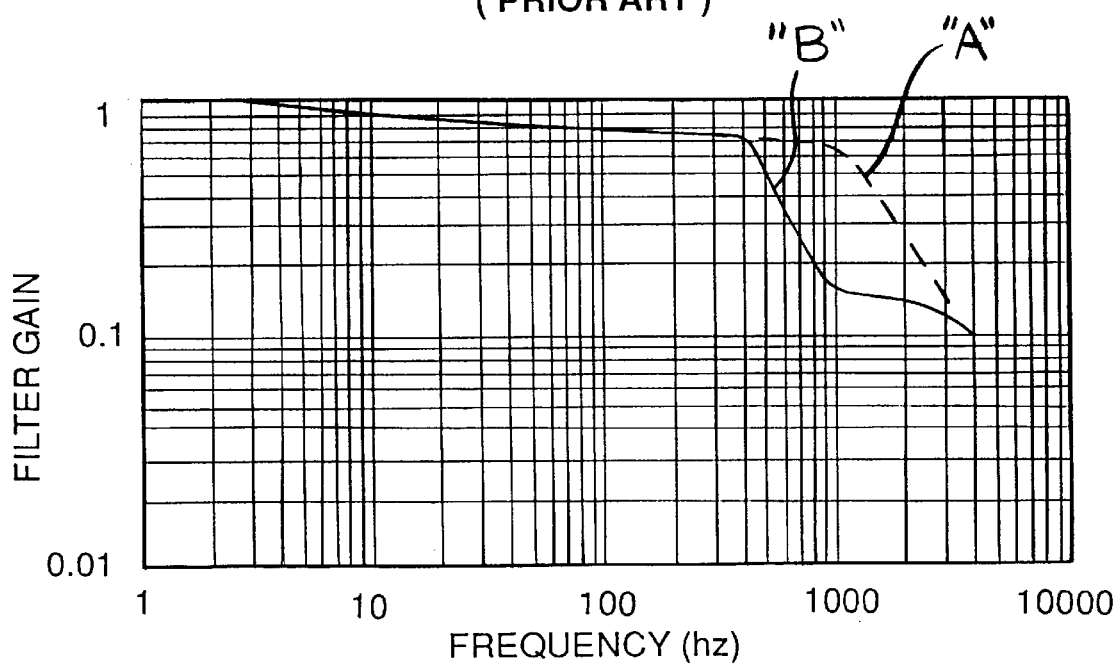
FIG. 2 is a graph illustrating filter frequency response curves.

The third filter capacitor 32 and resistor 33 cooperate to attenuate mid-range frequency signals, but do not excessively attenuate signals at high passband frequencies, as illustrated by the frequency response curve labeled "B" in FIG. 2. As shown in FIG. 2, the mid-range filter section 31 of the improved filter 30 provides increasing attenuation of the signals in the range of approximately 400 Hz to one KHz and constant attenuation above one KHz while the low pass filter sections 24 and 27 continue to attenuate the signals above one Khz.

Since the magnitude of the speed signal generated by the sensor 13 is proportional to wheel speed and the low pass filter sections 24 and 27 attenuate only at and above the highest frequencies of interest, there is normally an excess of speed signal magnitude in the mid-range frequencies. Thus, the mid-range frequency filter section 31 is operable to reject unwanted noise signals as long as those noise signals are less than the magnitude of actual speed signals. The lowest frequency signals, which have small magnitudes are left relatively unattenuated by the mid-range filter section 31 while the highest frequencies continue to be attenuated by the low pass filter sections 24 and 27.

It will be appreciated that, while values for the preferred embodiment have been described above, it is possible to adjust the frequency range and amount of attenuation of the mid-range filter section 31 by selecting different filter component values. Thus, if operation of a particular vehicle is known to produce noise signals having certain frequencies, the filter section 31 can be designed to attenuate signals at those specific frequencies by a specific amount.

Figure 4:
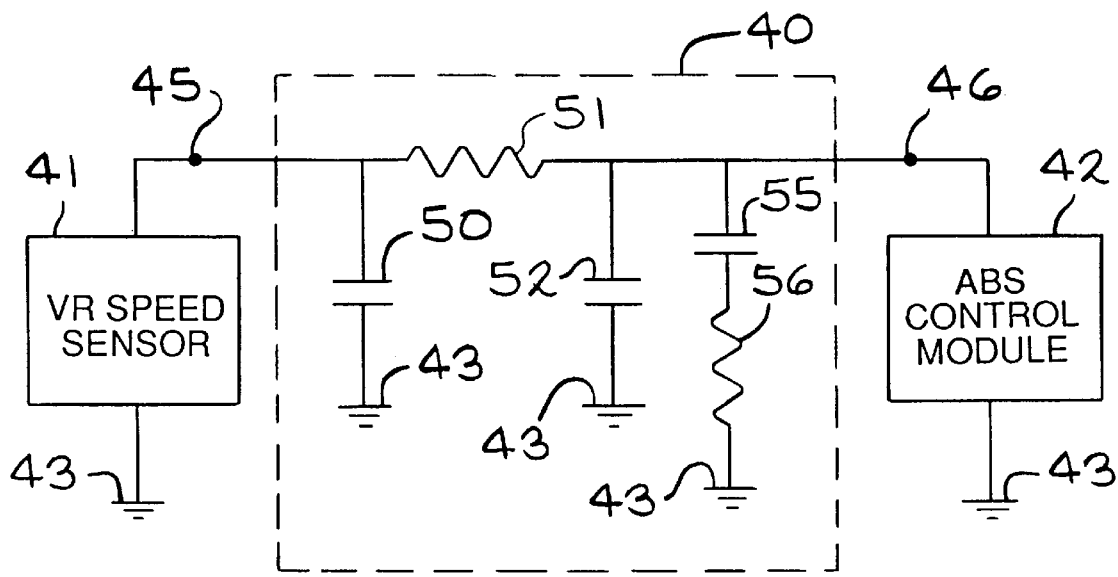
FIG. 4 is a schematic diagram of an alternate embodiment of the input filter shown in FIG. 3.

An alternate embodiment 40 of the improved input filter is shown in FIG. 4. The alternate embodiment 40 is a single ended circuit for use between a variable reluctance speed sensor 41 and an ABS electronic control module 42. Both the speed sensor 41 and the control module 42 are connected to a common ground 43. Accordingly, the input filter 40 has a single input terminal 45 connected to the speed sensor 41 and a single output terminal 46 connected to the control module 42.

The input filter 40 includes an EMC capacitor 50 connected between the input terminal 45 and ground. A low pass filter resistor 51 has one end connected to the input terminal 45 and a second end connected to a first end of a low pass filter capacitor 52. The low pass filter capacitor 52 has a second end connected to ground 43. The junction of the low pass filter resistor 51 and the low pass filter capacitor 52 is connected to both the output terminal 46 and one end of a mid-range filter capacitor 55. The other end of the mid-range filter capacitor is connected to a first end of a mid-range filter resistor 56. The filter resistor 56 has a second end connected to ground 43. The preferred embodiment of the filter 40 includes components having the values shown in the following table:

| Component | Value |
| --- | --- |
| EMC Capacitor | 0.001 uf |
| Low Pass Resistor | 44K |
| Low Pass Capacitor | 0.005 uf |
| Mid-Range Capacitor | 0.047 uf |
| Mid-Range Resistor | 8.2K |

The input filter 40 has a frequency response which is similar to the curve "B" shown in FIG. 2. As described above, the frequency response of the filter 40 can be adjusted to attenuate specific signal frequencies by selecting filter component having other values than shown above.

Figure 5:
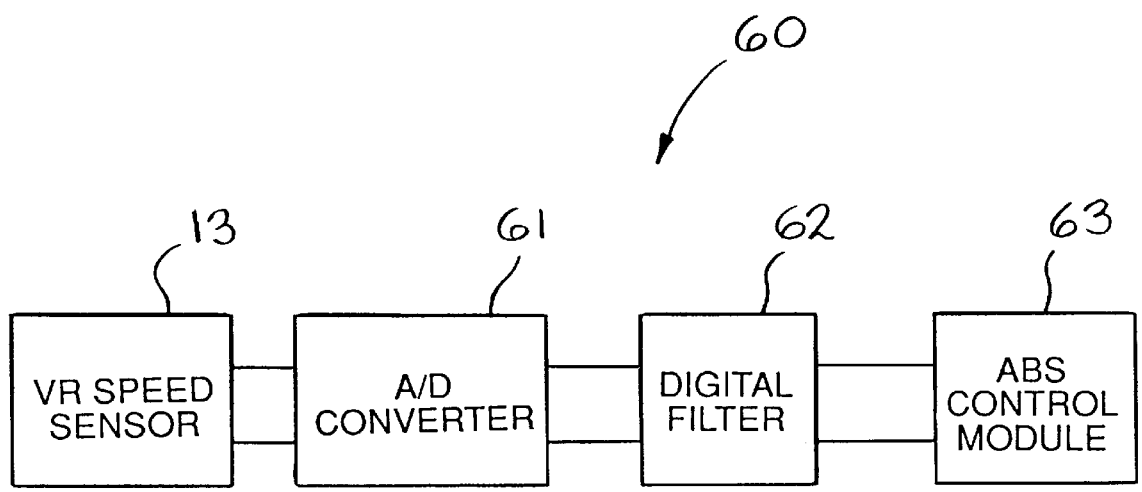
FIG. 5 is a block diagram of another alternate embodiment of the input filter shown in FIG. 3.

Another alternate embodiment 60 of the improved input filter is illustrated by the block diagram shown in FIG. 5. In FIG. 5, the speed sensor 13 is electrically connected to input terminals of an analog to digital converter 61. The converter 61 has a pair of output terminals which are connected to input terminals of a digital input filter 62. The digital input filter 62 has a pair of output terminals which are connected to input terminals of an ABS control module 63.

During operation of the filter 60, the analog speed signal generated by the sensor 13 is applied to the input of the analog to digital converter 61. The converter 61 generates a digital speed signal which is a function of the analog speed signal. The resulting digital speed signal is applied to the input of the digital filter 62. The digital filter 62 is programmed to attenuate the mid-range and high frequency signals present in the particular vehicle in which the ABS is installed. The filtered digital speed signal can be supplied directly to a microprocessor (not shown) in the control module 63.

Alternately, the digital filter can be included internally as a portion of the software for the ABS control module microprocessor. When this occurs, the digital speed signal is supplied directly from the analog/digital converter to the control module microprocessor (not shown). The digital signal is then filtered by the microprocessor software and the filtered output is supplied directly to the ABS control algorithms.

If the ABS has an analog control module, the filtered digital speed signal would be converted back to an analog speed signal by a digital/analog converter (not shown). The digital/analog converter would be connected between the digital filter 62 and the control module 63.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the improved input filter has been described and illustrated above as being separate from the ABS control module, it will be appreciated that the invention also can be practiced with the input filter included in the ABS control module. Additionally, the invention can also be practiced with other vehicular systems, such as, for example, traction control, vehicle stability control systems, and engine and transmission systems.

What is claimed is:

1. A system for controlling at least one vehicle wheel brake, said system comprising:

a speed sensor having an output port, said speed sensor adapted to monitor the speed of a vehicle wheel associated with the controlled wheel brake and operable to generate a wheel speed signal at said sensor output port, said wheel speed signal having a frequency which is proportional to the speed of said associated vehicle wheel;

a filter having an input port and an output port, said filter input port electrically coupled to said speed sensor output port, said filter including at least one low pass filter section which is electrically connected to said filter input and output ports, said low pass filter section operative to pass wheel speed signals within a range from zero hertz to a predetermined first frequency which is greater than zero, said low pass filter section attenuating wheel speed signals which have a frequency which is greater than said first predetermined frequency and rejecting noise signals at frequencies above said first predetermined frequency, said filter also including a mid-range frequency filter section electrically coupled to said low pass filter section, said mid-range frequency filter section having an attenuation which first increases and then becomes generally constant as the frequency of said wheel speed signal increases over a predetermined mid-range frequency band, said mid-range frequency filter section operable to reject noise signals having magnitudes which are less than said wheel speed signal over said mid-range frequency band, said mid-range frequency band extending from a second predetermined frequency to said first predetermined frequency, said second predetermined frequency being less than said first predetermined frequency and greater than zero hertz, said low pass filter section co-operating with said mid-range filter section to produce a filtered speed signal at said filter output port; and a brake system control module having a speed signal input port which is electrically coupled to said filter output port, said control module adapted to be connected to the controlled wheel brake and being responsive to said filtered wheel speed signal to selectively control the actuation of the controlled wheel brake.

2. A brake control system according to claim 1 wherein said low pass filter section includes a first resistor connected between said filter input and output ports and a first capacitor connected between said filter output terminal and ground and further wherein said mid-range frequency filter section includes a second capacitor having first and second ends, said first end of said second capacitor being connected to said filter output port, said mid-range filter section also including a second resistor connected between said second end of said second capacitor and said ground.

3. A brake control system according to claim 2 further including an electromagnetic compatibility capacitor connected between said filter input port and ground.

4. A brake control system according to claim 1 wherein said filter includes first and second input ports adapted to be connected across said wheel speed sensor and first and second output ports adapted to be connected to said control module with said low pass filter section being a first low pass filter section, said first low pass filter section being connected between said first input port and said first output port, and said mid range frequency filter section being connected between said filter output ports and further wherein said filter also includes a second low pass filter section connected between said second input port and said second output port, said first and second low pass filter sections being operable to attenuate signals which have a frequency which is greater than said first predetermined frequency.

5. A brake control system according to claim 4 wherein each of said first and second low pass filter sections include a resistor connected between one of said input ports and one of said output ports and a capacitor connected between the junction of said resistor and said output port and ground and further wherein said mid-range filter section includes a mid-range filter capacitor having first and second ends, said first end of said mid-range filter capacitor being connected to one of said filter output ports, and a mid-range filter resistor connected between said second end of said mid-range filter capacitor and the other of said filter output ports.

6. A brake control system according to claim 5 wherein said control module is included in an anti-lock brake system.

7. A brake control system according to claim 5 further including an electromagnetic compatibility capacitor connected between said filter input ports.

8. A brake control system according to claim 2 wherein said control module is included in an anti-lock brake system.

9. A brake control system according to claim 2 wherein said control module is included in a traction control system.

10. A brake control system according to claim 2 wherein said control module is included in a vehicle stability control system.

11. A brake control system according to claim 5 wherein said control module is included in a traction control system.

12. A brake control system according to claim 5 wherein said control module is included in a vehicle stability control system.

* * * * *